United States Patent [19]

Mims

[11] Patent Number: 4,799,169

[45] Date of Patent: Jan. 17, 1989

[54] GAS WELL FLOW INSTRUMENTATION

[75] Inventor: Charles R. Mims, Sumrall, Miss.

[73] Assignee: Mark Industries, Inc., Goshen, Ky.

[21] Appl. No.: 161,429

[22] Filed: Feb. 24, 1988

Related U.S. Application Data

[63] Continuation of Ser. No. 56,271, May 26, 1987, abandoned, which is a continuation of Ser. No. 660,130, Oct. 12, 1984, abandoned.

[51] Int. Cl.⁴ .............................................. G01F 1/00
[52] U.S. Cl. ................................ 364/510; 73/861.02; 73/861.03
[58] Field of Search ............... 364/509, 510, 550, 571; 73/861.02, 861.03

[56] References Cited

U.S. PATENT DOCUMENTS

| | | | |
|---|---|---|---|
| 1,877,810 | 9/1932 | Chamberlain | 137/486 |
| 1,931,474 | 10/1933 | Ryder | 236/70 |
| 1,977,498 | 10/1934 | Staegemann | 73/861.44 |
| 2,264,370 | 12/1941 | Harrison | 235/61 C |
| 2,566,803 | 6/1951 | Eckman | 242/217 |
| 2,611,812 | 9/1952 | Hornfeck | 340/870.05 |
| 3,322,339 | 5/1967 | Nolte | 235/61 R |
| 3,407,658 | 10/1968 | Kerbow et al. | 73/861.02 |
| 3,742,515 | 6/1973 | Yeiser | 346/49 |
| 3,752,393 | 8/1973 | Moseley | 364/510 |
| 3,980,865 | 9/1976 | Messer et al. | 364/510 |
| 4,133,034 | 1/1979 | Etter | 364/464 |
| 4,149,254 | 4/1979 | Molusis | 364/510 |
| 4,150,721 | 4/1979 | Norwood | 166/53 |
| 4,173,891 | 11/1979 | Johnson | 364/510 X |
| 4,326,411 | 4/1982 | Gant et al. | 364/510 X |
| 4,355,365 | 10/1982 | McCracken et al. | 377/2 |
| 4,390,956 | 6/1983 | Cornforth et al. | 73/861.03 X |
| 4,414,634 | 11/1983 | Louis et al. | 364/510 |
| 4,527,600 | 7/1985 | Fisher et al. | 364/510 X |
| 4,562,744 | 1/1986 | Hall et al. | 73/861.02 |
| 4,581,707 | 4/1986 | Millar | 364/510 X |

OTHER PUBLICATIONS

Brochure File No. 1800:215-2 Meriam Instrument of Cleveland Ohio "Digital Flow Totalizer".

Primary Examiner—Gary V. Harkcom
Assistant Examiner—H. R. Herndon
Attorney, Agent, or Firm—Cushman, Darby & Cushman

[57] ABSTRACT

Gas well flow instrumentation includes a computation unit and an interrogation unit. The computation unit measures parameters of gas flow at the well head and accumulates gas flow information over a plurality of different independent time intervals. The interrogation unit selectively accesses the stored information and makes a permanent record of the information. The interrogation unit also is used to calibrate the computation unit and to perform a number of other different functions. The interrogation unit includes an integral printer which documents the flow information for subsequent proof of acutal gas flow.

15 Claims, 10 Drawing Sheets

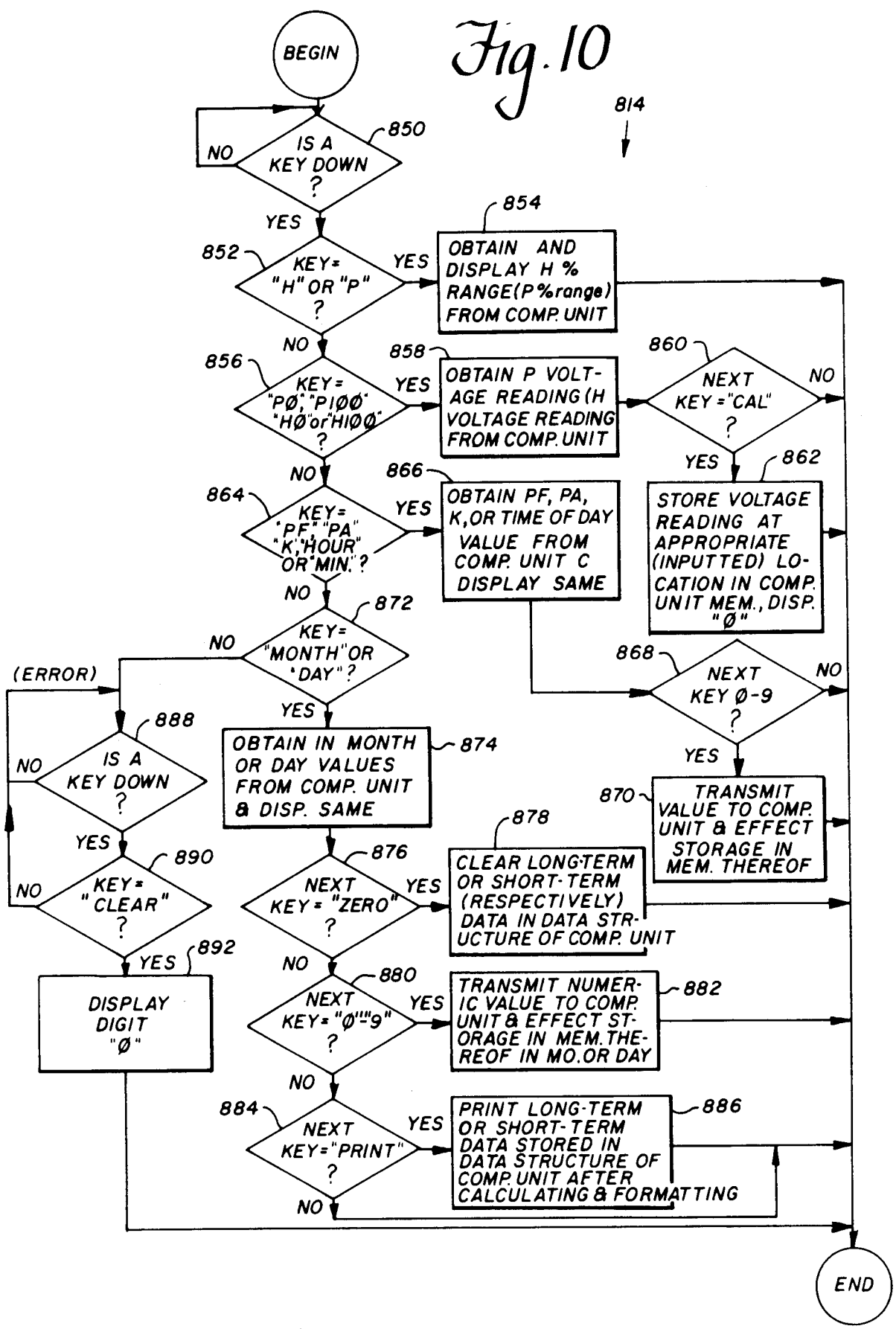

GAS WELL FLOW INSTRUMENTATION

This is a continuation of application Ser. No. 56,271, filed May 26, 1987, now abandoned, which is a continuation of Ser. No. 660,130, filed Oct. 12, 1984, now abandoned.

FIELD OF THE INVENTION

The invention is related to gas well logging, and more particularly, to ascertaining the volume of gas produced by a natural gas well over a period of time.

BACKGROUND OF THE INVENTION

In the gas producing industry, information about the volume of gas flowing through a pipeline is extremely valuable to both gas producers and gas consumers. Production managers often find such information invaluable in making decisions about how to manage a particular well. Information about gas flow volume is also indispensable for determining the amount of money owed by a consumer to a producer. Often, a producer and a consumer each monitor the amount of gas flowing through their respective ends of a gas distribution pipeline. The producer bills the consumer based upon the producer's flow volume measurements. The consumer uses his own measurements to confirm the accuracy of the producer's measurements, and may dispute the amount which he has been billed if the producer claims a higher flow volume than the consumer himself has measured.

Circular chart recorders are widely used in the gas production industry for measuring the volume of gas flowing through a pipeline over a period of time. Such chart recorders provide a relatively inexpensive way to continuously permanently record gas flow volumes over predetermined time periods. Chart recorders usually plot two different flow parameters: differential pressure across a restriction placed in the pipeline, and static gas pressure in the pipeline at some distance from the restriction. From this information (together with atmospheric pressure and gas temperature), the volume of gas may be calculated in a well known manner.

Many commercially available chart recorders (such as, for instance, the Model 515A Recording Flow Meter manufactured by Reynolds Equipment Company of Garland, Texas) may be set to record data at different rates (e.g. seven days or 24 days). Such chart recorders selectivity rotate the circular chart onto which information is plotted at one of two different speeds depending upon desired measurement accuracy. A rapidly-rotating circular chart records measurements with a high degree of accuracy, but must be replaced often. A chart recorder which rotates its circular chart at a slower rate needs less attention, but produces less accurate results.

Of course, a circular chart recorder is only capable of recording flow rate versus time. The resulting charts must be interpreted to ascertain gas flow volume over a given time interval. Typically, such analysis is performed by manually ascertaining the area under the curves plotted on the chart. Although it is difficult to accurately determine the area under the curve of a plot, the accuracy of such determinations was sufficient in the past to provide reasonably accurate flow volume data for billing and other purposes.

As gas prices have increased, accuracy in the ascertainment of gas flow volumes has become extremely critical to both producers and consumers. Measurement inaccuracies of even a few percent can translate into large billing errors. Because of the inherent inaccuracies of chart recorder logging, it is rare that the measurements taken by a producer exactly agree with the measurements taken by the consumer when chart recorders are used for logging. Moreover, measurements can be manipulated by intentionally overestimating or underestimating the area under the plotted curves of a chart, or by intentionally miscalibrating the chart recorder. Most chart recorders use simple mechanical linkages to connect flow sensing devices to the chart recorder pens. Such mechanical linkages are made adjustable to permit calibration of the chart recorder. It is a relatively simple operation for an unscrupulous producer or consumer to misadjust the mechanical linkages in its favor. Measurement inaccuracies, both inherent and intentional, result in contract disputes which often must be litigated in the courts, increasing the costs of doing business in the gas producing industry.

Attempts have been made in the past to increase gas well logging accuracy. The following U.S. patents disclose mechanical approaches to increasing logging accuracy:

U.S. Pat. No. 1,887,810 to Chamberlain (1932);
U.S. Pat. No. 2,556,803 to Eckman (1951);
U.S. Pat. No. 3,322,339 to Nolte (1967);
U.S. Pat. No. 1,977,498 to Staegemann (1934); and
U.S. Pat. No. 2,264,370 to Harrison (1941).

More recently, electronic circuitry has been used to replace mechanical well logging device components to achieve greater accuracy and versatility. For example, U.S. Pat. No. 4,414,634 to Louis et al (issued Nov. 8, 1983) discloses a microprocessor-based gas flow totalizer which translates the positions of the pens of a chart recorder into electrical signals and further processes the electrical signals to obtain flow volume over a period of time. This logging system (which is also disclosed in Brochure File No. 1800:215-2 published by Meriam Instrument of Cleveland, Ohio) features an optional split keyboard arrangement for permitting an electronic flow calculator to be used at multiple locations. U.S. Pat. No. 3,980,865 to Messer et al (1976) discloses an apparatus which uses optical encoders to convert the rotation of a chart recorder and angles of the swing of chart recorder pen arms to digital values which are accumulated and printed. U.S. Pat. No. 3,742,515 to Yeiser (1973) discloses an electronic integrator which continuously computes the area under a curve drawn by a chart recorder. U.S. Pat. No. 1,931,474 to Ryder (1933) teaches a hybrid electronic/mechanical chart recording apparatus for ascertaining rate of fluid flow.

Other attempts have been made to replace mechanical chart recording devices with entirely electronic measuring systems. See, for example, U.S. Pat. No. 4,149,254 to Molusis (1979), U.S. Pat. No. 3,752,393 to Mosley (1973), U.S. Pat. No. 3,407,658 to Kerbow et al (1968) and U.S. Pat. No. 2,611,812 to Hornfeck (1952), all of which disclose flow measuring devices making extensive use of electronic processing. See also U.S. Pat. No. 4,355,365 to McCracken et al (Oct. 19, 1982) and U.S. Pat. No. 4,150,721 to Norwood (1979), which disclose electronic gas well controllers.

SUMMARY OF THE INVENTION

Unfortunately, the electronic gas well logging devices which have been developed heretofore are not particularly user friendly, and are therefore difficult to operate by all except experienced engineers or production managers. Those employed to work in the gas fields are often not very well educated, and may be unwilling or unable to learn complex command protocol required to properly extract the very valuable information which is recorded by electronic well logging devices. Those logging systems which require an operator to have a thorough understanding of volume flow calculation in order to permit him to obtain useful gas flow information are therefore impractical for operation by unskilled field workers. Moreover, commercially available logging devices do not provide adequate documentation of gas flow measurements which could later be used as proof of billing accuracy.

The present invention is a system and method for electronically measuring the volume of gas flowing through a pipeline with a high degree of accuracy and reliability. The present invention is easy to operate by even an unskilled individual, and provides documentation of logged values which can later be used as proof of measurement accuracy. A measuring device adapted to operatively connect to a gas conduit produces a signal indicative of at least one flow parameter of gas flowing through the conduit. A computing device produces indicia of the amount of gas flowing through the conduit over a first time interval from the signal provided by the measuring device. A storing device stores the indicia of amount of flow. A portable interrogation unit operatively connectable to the storing device extracts the stored indicia of amount of flow and makes a permanent record of amount of flow over the first time interval.

The computing device preferably produces a plurality of indicia of gas flow amount, each of the plurality of indicia associated with a different one of a plurality of different time intervals. The storing device stores each of the plurality of indicia. The portable interrogation unit preferably extracts a selected one of the plurality of indicia.

BRIEF DESCRIPTION OF THE DRAWINGS

These and other features of this invention will be more completely appreciated by reading the following detailed description taken in conjunction with the accompanying drawings, of which:

FIG. 10 is a flow chart of the "process subsequent keystrokes" block 814 shown in FIG. 9.

DETAILED DESCRIPTION OF THE PREFERRED EMBODIMENT

Figure 1:
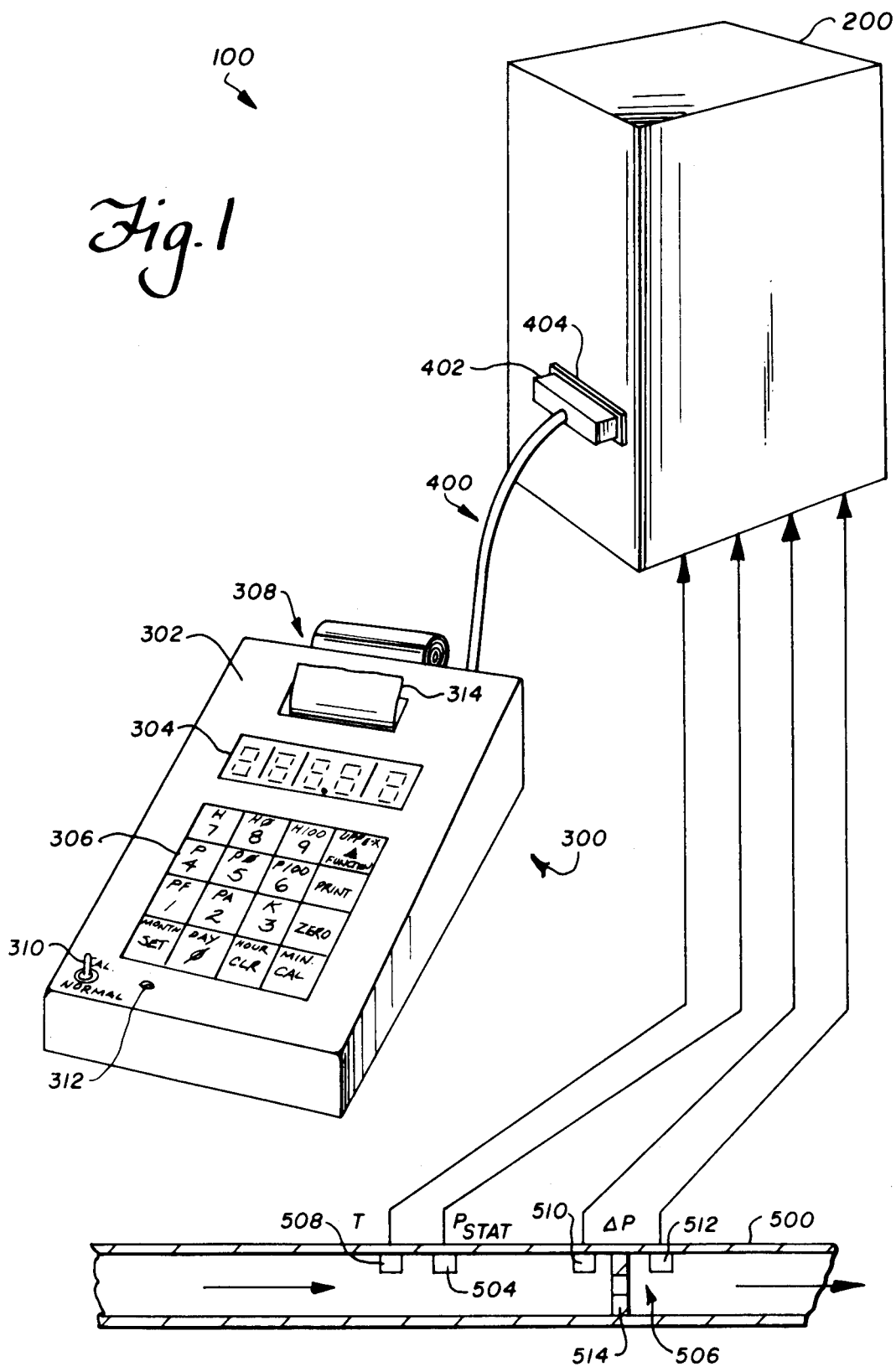
FIG. 1 is an elevated view and schematic view of the presently preferred exemplary embodiment of the present invention.

FIG. 1 is an elevated and schematic view of the presently preferred exemplary embodiment of a well logging system in accordance with the present invention. System 100 mainly comprises a computation unit 200, an interrogation unit 300 and an interconnecting cable 400. Computation unit 200 is adapted to be operatively connected to a pipeline 500 through which a quantity of gas 502 is flowing. System 100 measures and records commercially useful data about the flow of gas 502 through pipeline 500 (such as, for instance, flow volume, average static gas pressure, average differential gas pressure and average gas temperature, all over specified time intervals) to permit analysis of the performance history of the gas well supplying the pipeline.

Computation unit 200 is preferably fixedly disposed at the well head or other desired measurement point, and continuously measures and records useful information. Interrogation unit 300 is preferably a portable, hand-held device which is carried from one well site to the next to extract and document the useful information stored by a plurality of computation units 200. Cable 400 selectively connects interrogation unit 300 to computation unit 200, and is used to connect the two units together only when information is actually being extracted from the computation unit (or when the information stored in the computation unit is being manipulated in some other way). Interrogation unit 300 is also used to initialize computation unit 200 when the computation unit is initially installed, and to periodically recalibrate the computation unit to ensure accuracy of system 100. Interrogation unit 300 may also be used to troubleshoot improper operation of computation unit 200 in the event that the computation unit is not logging information correctly.

Means for measuring gas flow parameters (comprising, in the preferred embodiment, a static gas pressure sensor 504, a differential gas pressure sensor (manometer) 506 and a gas temperature sensor 508) are provided. Gas temperature sensor 508 is preferably a resistive temperature sensing device which is disposed within pipeline 500 in contact with gas 502. Temperature sensor 508 changes resistance in an amount proportional to the change in temperature of gas 502. Static pressure sensor 504 is also disposed within pipeline 500, and produces an electrical signal proportional to the static pressure of the gas flowing through the pipeline. Differential gas pressure sensor 506 in the preferred embodiment comprises a first pressure transducer 510, a second pressure transducer 512 and a precision pipeline restriction 514. Restriction 514 is disposed within pipeline 500 and restricts the cross-sectional diameter of the pipeline available for the flow of gas 502. Transducers 510 and 512 are positioned within pipeline 500 at opposite sides of restriction 514, and together measure the differential gas pressure across the restriction (which, as is well known, is indicative of the rate of flow of gas 502 through the pipeline). The difference between the electrical signals produced by transducers 510 and 512 is thus proportional to differential gas pressure across restriction 514. Static gas pressure sensor 504 and differential pressure sensor 506 may comprise any conventional electronic or electromechanical transducer devices having the requisite accuracy, reliability and stability (for instance, sensor 506 may comprise a conventional manometer which directly measures differential pressure if desired).

Computation unit 200 is connected to receive the electrical signals provided by static gas pressure sensor 504, differential gas pressure sensor 506 and gas temperature sensor 508. Computation unit 200 computes useful data from these electrical signals, and stores the computed data for later retrieval by interrogation unit 300.

Interrogation unit 300 comprises a housing 302, a display 304, a keyboard 306, a printer 308, a "calibrate/normal" switch 310 and an indicator 312. Interrogation unit 300 is permanently connected to cable 400. Cable 400 terminates in a quick-disconnect connector 402 which mates with a connector 404 disposed on an outer surface of the housing of computation unit 200. Interrogation unit 300 contains no power supply of its own in the preferred embodiment, but instead is powered from an internal battery power source of computation unit 200 via cable 400 (as will be explained).

An operator inputs commands and information to interrogation unit 300 (once it has been connected to computation unit 200 via cable 400) to initialize and calibrate computation unit 200 and/or to "interrogate" the computation unit (thereby extracting recorded information from the computation unit). Information may be displayed by display 304 (which, in the preferred embodiment, comprises a five digit seven segment electronic display), or may be printed onto paper 314 by printer 308.

Switch 310 of interrogation unit 300 selects between a "calibrate" mode and a "normal" mode of operation. The "normal" mode is used whenever the functions to be performed by system 100 do not require interruption of gas flow parameter sampling by computation unit 200. The "calibrate" mode is used during initialization and calibrating procedures (which may require interruption of routine data logging). In this way, system 100 periodically samples gas flow parameter data continuously (even when interrogation unit 300 is connected to computation unit 200) except during infrequent calibration and initialization to ensure that no data is lost (as will be explained, precautions are taken to ensure that logging accuracy is maintained even during in-use calibration). Switch 310 should always be in the "normal" position except when calibrating system 100 while the system is in use.

Figure 2:
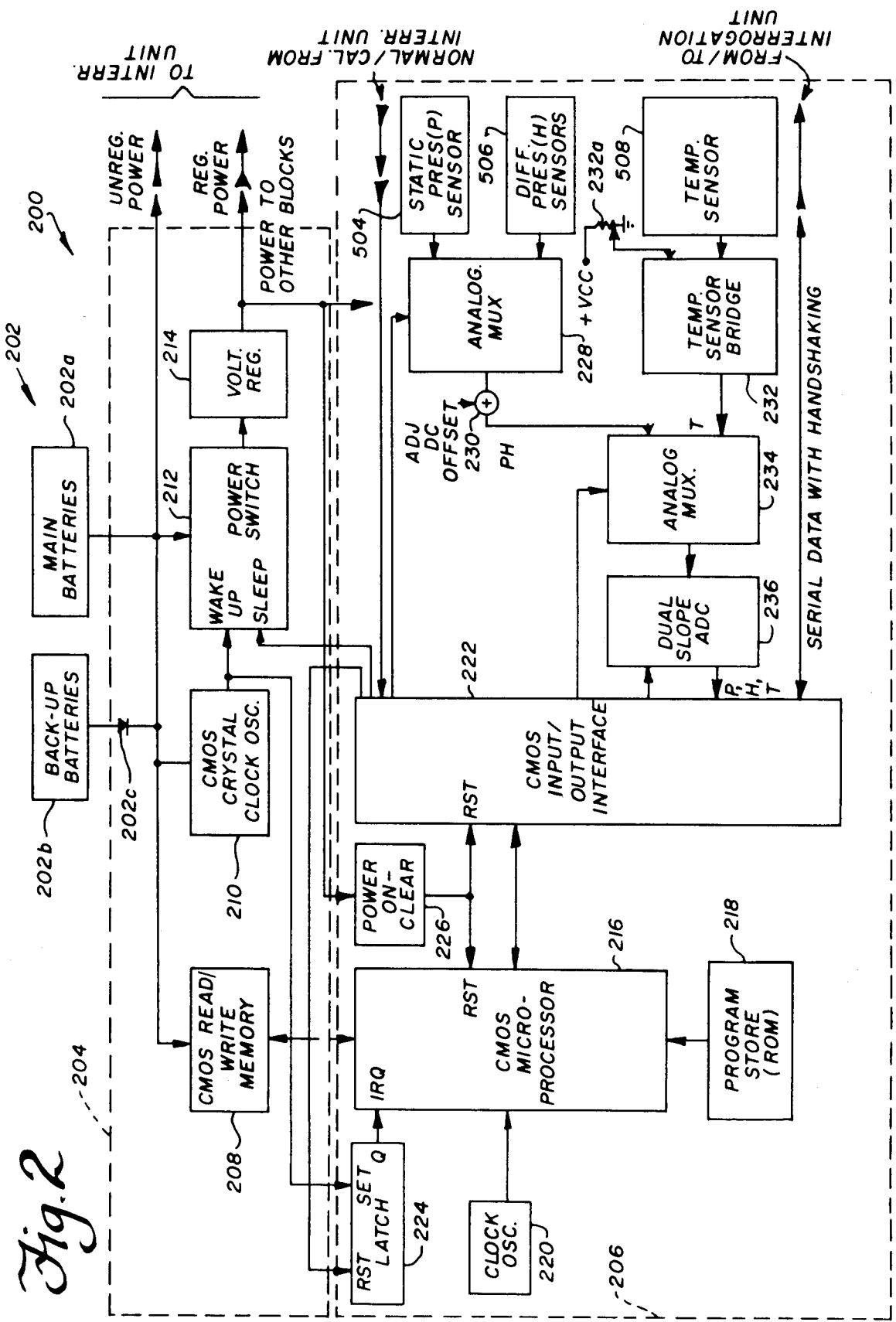
FIG. 2 is a block diagram of the computation unit shown in FIG. 1.

FIG. 2 is a block diagram of computation unit 200. Computation unit 200 mainly comprises a battery power supply 202, an always-active subsystem 204 (which is continuously powered by supply 202) and a periodically-activated subsystem 206 (which is only supplied with power when necessary). Battery power supply 202 comprises a main battery 202a and back-up batteries 202b. In the preferred embodiment, the main battery 202a consists of three 2-volt four amp-hour gelled lead-acid cells connected in series, while the secondary batteries 202b comprise four standard 1.5 volt alkaline AA cells connected in series. Back-up batteries 202b are connected to main batteries 202a through a diode 202c to prevent the main batteries from discharging through the back-up batteries. Main batteries 202a provide power for both subsystems 204 and 206 of computation unit 200 and to interrogation unit 300 (the latter only when it is connected to the computation unit via cable 400). Back-up batteries 202b supply power to computation unit 200 only when main battery 202a is disconnected (such as when the main battery is being exchanged with a fully-charged replacement) to prevent loss of data stored by the computation unit. In the preferred embodiment, it is not desirable to power the interrogation unit 300 from back-up batteries 202b because of the insufficient capacity of the back-up batteries. Of course, system 100 could be electrically powered in other ways (such as by power lines if available, solar cells,etc.)

Subsystem 204 of computation unit 200 is continuously powered by battery power supply 202. Subsystem 204 mainly comprises a complementary metal oxide semiconductor (CMOS) read/write random access memory (RAM) 208, a conventional crystal-controlled clock oscillator 210, a power switch 212 and a voltage regulator 214. RAM 208 stores all of the information logged by computation unit 200 for later retrieval by interrogation unit 300. Because RAM 208 is continuously powered by supply 202, it is non-volatile and therefore retains the information which it stores over long periods of time.

Oscillator 210 produces a periodic square wave signal (which, in the preferred embodiment, has a period of 8.000 seconds) which periodically causes power to be applied to subsystem 206 to prompt subsystem 206 to make a gas flow measurement. The output of oscillator 210 is connected to power switch 212. Power switch 212 connects power from supply 202 to voltage regulator 214 in response to the output of oscillator 210. Voltage regulator 214 supplies power to subsystem 206. Because power is only applied to subsystem 206 during the time when measurements are actually being performed (a very small proportion of the total time), supply 202 may supply power to system 100 for very long periods of time (approximately 2 months or more) before requiring recharging or replacement of batteries 202a. To reduce total power consumption of system 100, RAM 208 is placed in a low power consumption state with its memory content still active when subsystem 208 is in its "sleep" (inactive) mode.

Subsystem 206 performs the principal gas flow measurement and logging functions of system 100. Subsystem 206 mainly comprises a microprocessor 216, a program store (ROM) 218, a clock oscillator 220, an input/output interface 222, a latch 224, a power-on clear circuit 226, an analog multiplexer 228, an analog adder 230, a temperature sensor bridge 232, an analog multiplexer 234 and an analog-to-digital converter (ADC) 236. Microprocessor 216 (which, in the preferred embodiment, comprises a CMOS 65C02 microprocessor) controls the sequence of operation of much of computation unit 200 in accordance with firmware resident in program store 218 (which preferably comprises a 27C16 integrated circuit memory device). Microprocessor 216 may read information from and write information to RAM 208 (a 6116 integrated circuit in the preferred embodiment) and may obtain data from and write data to I/O interface 222. Program store 218, RAM 208 and I/O interface 222 may share a conventional microprocessor address bus and a conventional microprocessor data bus, as is well known. RAM 208, program store 218 and I/O interface 222 may all be memory-mapped into the same address space to permit microprocessor 216 to selectively access each device individually.

In the preferred embodiment, I/O interface 222 comprises a 65C22 versatile interface adapter which routes data to and from the parallel data ports of microprocessor 216. Controller 222 also performs parallel-to-serial and serial-to-parallel conversion of data to permit communication between computation unit 200 and interrogation unit 300 over a serial data line contained in cable 400. Hence, interface 222 acts as both a data interface and a data transceiver.

Clock oscillator 220 in the preferred embodiment comprises a conventional crystal-controlled clock oscillator entirely conventional in design having an output frequency of approximately 1 MHz. Oscillator 220 controls the access time of microprocessor 216.

Static pressure sensor 504 and differential pressure sensor 506 are connected to different inputs of a two-input analog multiplexer 228 (the outputs of transducers 510 and 512 of differential pressure transducers 510 and 512 may be amplified, buffered and subtracted from one anther first by a conventional adjustable-gain differential amplifier). Microprocessor 216 may select between the signal provided by static pressure sensor 504 and the signal provided by differential pressure sensor 506 by selecting a desired input of multiplexer 228 via interface 222. The output of analog multiplexer 228 is connected to an input of an analog adder 230 the other input of which is connected to an adjustable DC offset voltage (produced in a conventional manner) in the preferred embodiment. The output of adder 230 is connected to one input of an analog multiplexer 234.

Temperature sensor 508 (in the preferred embodiment, a platinum resistive temperature detector having a resistance of 100.0 ohms at 0° C. which linearly increases with temperature by 0.392 ohms per °C.) is connected to one arm of an unbalanced resistive bridge 232 the other arm of which is connected to a variable resistor 232a. Resistor 232a is adjusted (during initial calibration of system 100) to produce a desired voltage output of bridge 232. The output of bridge 232 is applied to the other input of analog multiplexer 234. The output of multiplexer 234 is applied to the input of analog-to-digital (ADC) converter 236. ADC 236 in the preferred embodiment comprises a conventional MC1405 dual slope ADC integrated circuit which converts the output of analog multiplexer 234 to a digital value under the control of microprocessor 216 in a well known manner. The output of ADC 236 is applied to I/O interface 222, which passes the information along to microprocessor 216.

Microprocessor 216 may, via I/O interface 222, sample the digitized output of any one of static pressure sensor 504, differential pressure sensor 506 and temperature sensor 508 to measure gas flow parameters. Microprocessor 216 may also read data transmitted to computation unit 200 via cable 400 by the interrogation unit 300, or transmit data to the interrogation unit via the cable.

At 8.000 second intervals (as prompted by crystal oscillator 210), power switch 212 causes power to be connected to subsystem 206. A power-on clear circuit 226 conventional in design causes microprocessor 216 and I/O interface 222 to hardware-reset. At the same time, crystal oscillator 210 sets a latch 224 the output of which is applied to the interrupt request input IRQ of microprocessor 216. Microprocessor 216 traps to an interrupt handler (to be explained in greater detail shortly) to sample gas flow parameters (e.g. to measure and store the voltages produced by sensors 504, 506 and 508 and to perform computations on those voltages). After microprocessor 216 has executed the flow sampling interrupt handler, it resets latch 224, thereby removing the pending interrupt request generated by the latch. Microprocessor 216 also resets the power switch 212 at this time unless interrogation unit 300 is connected (sensed in the preferred embodiment by determining if one or more pins of connector 404 are grounded). Power switch 212 disconnects power from subsystem 206 until oscillator 210 produces another pulse (e.g. 8.000 seconds later), thereby saving battery power.

Figure 3:
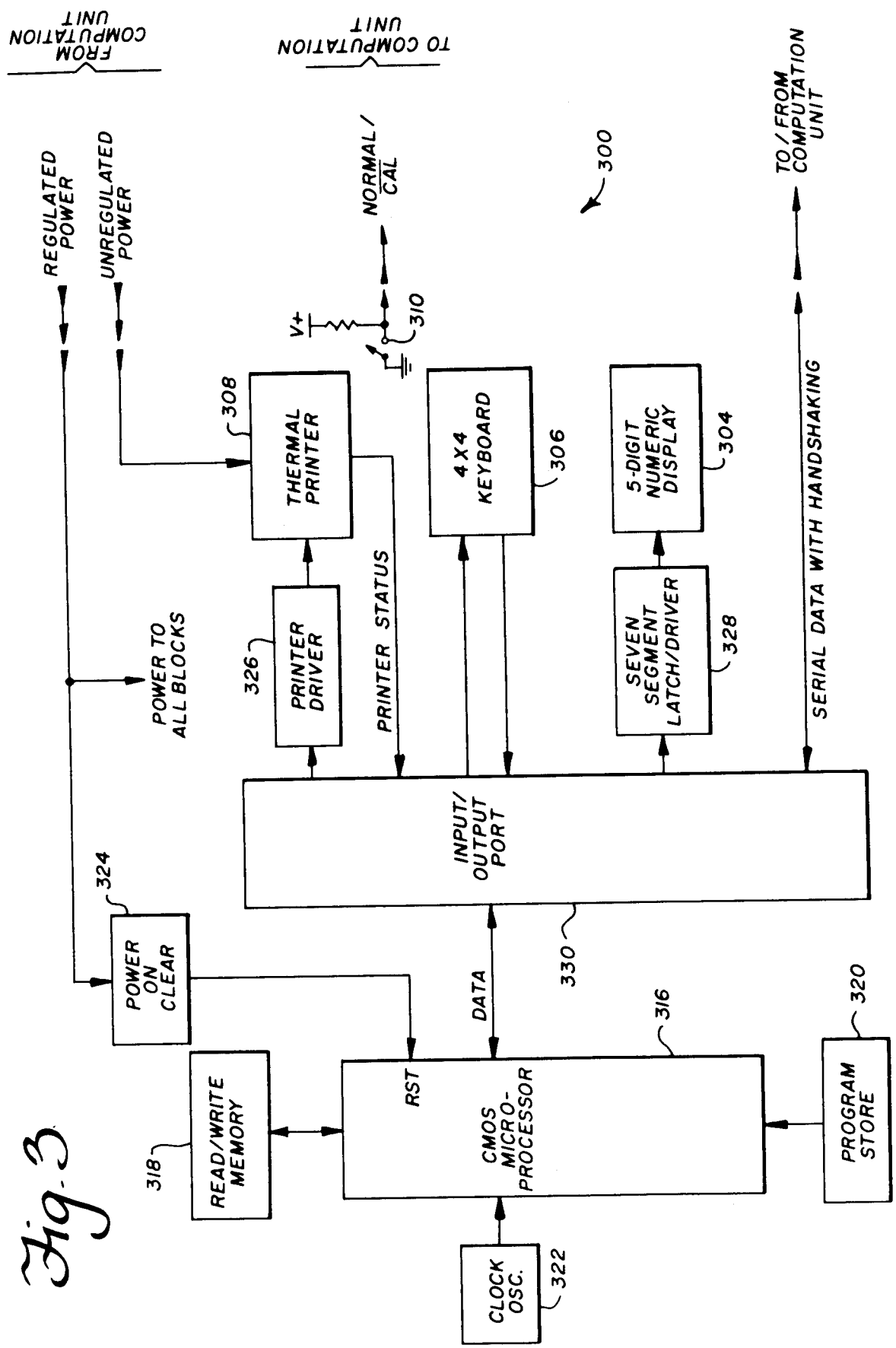
FIG. 3 is a block diagram of the interrogation unit shown in FIG. 1.

FIG. 3 is a block diagram of interrogation unit 300. In addition to the components of interrogation unit 300 previously described in connection with FIG. 1, the interrogation unit also comprises a microprocessor 316, a read/write memory (RAM) 318, a program store (ROM) 320, a clock oscillator 322, a power-on clear circuit 324, a printer driver 326, a seven segment latch/driver 328 and an I/O data interface 330. In the preferred embodiment, microprocessor 316 comprises a 65C02 CMOS microprocessor, program store 320 comprises a 2732 EPROM, and RAM 318 comprises a 6116 integrated circuit. I/O interface 330, as in the computation unit 200, comprises a 65C22 interface in the preferred embodiment, and is used to route data from keyboard 306, to thermal printer 308 and to display 304 in addition to transceiving data carried via the serial data path of cable 400. As mentioned previously, interrogation unit 300 contains no power source of its own, but rather, is powered from the battery power supply 202 of computation unit 200 whenever the interrogation unit is connected to the computation unit via cable 400.

When power is initially applied to interrogation unit 300 (i.e. when connector 402 is plugged into connector 404 on computation unit 200), power-on clear circuitry 324 causes microprocessor 316 (and other components) to hardware-reset. Microprocessor 316 begins executing program instructions (to be explained in greater detail shortly) stored in program store 320. Under control of such program instructions and synchronized by the output of oscillator 322 (suitably having a frequency of 1 MHz), microprocessor 316 scans keyboard 306 to determine if a key of the keyboard has been depressed. If a key has been depressed, the resulting signal is debounced and decoded to determine which key was depressed, and appropriate action is taken in response thereto. For instance, microprocessor 316 can initiate an exchange of information with computation unit 200, specify information to be displayed by display 304 (via conventional seven segment latch/driver 328) and cause thermal printer 308 to print information (via conventional printer driver 326). Serial data is transmitted via cable 400 between interface 330 of interrogation unit 300 and interface 222 of computation unit 200 using conventional protocol and utilizing additional handshaking (and synchronization) lines all conventional in design (of course, any suitable means for transmitting information between the two units could be used instead). The content of the information which is transmitted between computation unit 200 and interrogation unit 300 will be explained shortly.

Thermal printer 308 is an MTP-102-13, thirteen column thermal printer in the preferred embodiment which can operate with supply voltages ranging from 3.0 to 5.0 volts DC. The printing mechanism (not shown) of thermal printer 308 comprises a conventional moving head with seven resistive heating elements (approximately 15 ohms per element) arranged in a vertical column. These heating elements are individually heated to mark the thermal-sensitive paper 314 from its underside as the head travels at a constant speed from left to right over the paper. Individual characters are printed on paper 314 as 5×7 dot patterns with 2 dot spaces separating characters. Printer 308 includes one or more printer status lines of conventional design which send data to interface 330 indicating printer status (such as printer head position). Printer 308 is small enough to be incorporated directly into housing 302 of interrogation unit 300 (of course, an external printer could be used instead, although it is more convenient to use a printer integral with the interrogation unit). Program store 320 includes a section of conventional code which removes information from a specified location in RAM 318 and causes it to be printed by printer 308 in a desired format.

Display 304 is used to verify keystrokes input via keyboard 306 and to temporarily display calibration values during calibration of system 100. Display 304 in the preferred embodiment comprises a conventional bank of 5082-7653 seven segment common cathode display modules. Each of the modules of display 304 is time-multiplexed at a 250 Hertz rate in a conventional manner. The center module of display 304 includes a decimal point which may be selectively illuminated by microprocessor 316. Of course, any suitable display device (such as a LCD display device, etc.) could be used as display 304.

Keypad 306 is an array of normally-open membrane switches of conventional design arranged in a 4×4 matrix. Keyboard 306 is scanned (e.g. every 4 milliseconds) in a conventional fashion to determine if one or more keys have been depressed under control of conventional software stored in program store 320. All key closures are software debounced in a conventional manner.

As is more clearly depicted in FIG. 1, each of the keys of keyboard 306 is imprinted with one or more numerical or command symbols, thereby dedicating each key to one or more predetermined functions. Most keys serve dual functions, one of the two dual functions of a given key being selected depending upon whether the "upper function" key (position at the upper right-hand corner of the keyboard) is depressed immediately before the given key is depressed. Most people are familiar with this "second function" concept since it is widely used on hand-held calculators; of course, keyboard 306 could be expanded to include more keys (one key dedicated to each individual function) if desired. In the preferred embodiment, the "lower function" significances of the keys of keyboard 306 are generally decimal digits or operations while the "second function" significances are measurement parameters. The "second functions" of the keys of keyboard 306 are organized by row in the order in which they are pressed during calibration procedures, as will be explained.

Figure 4:
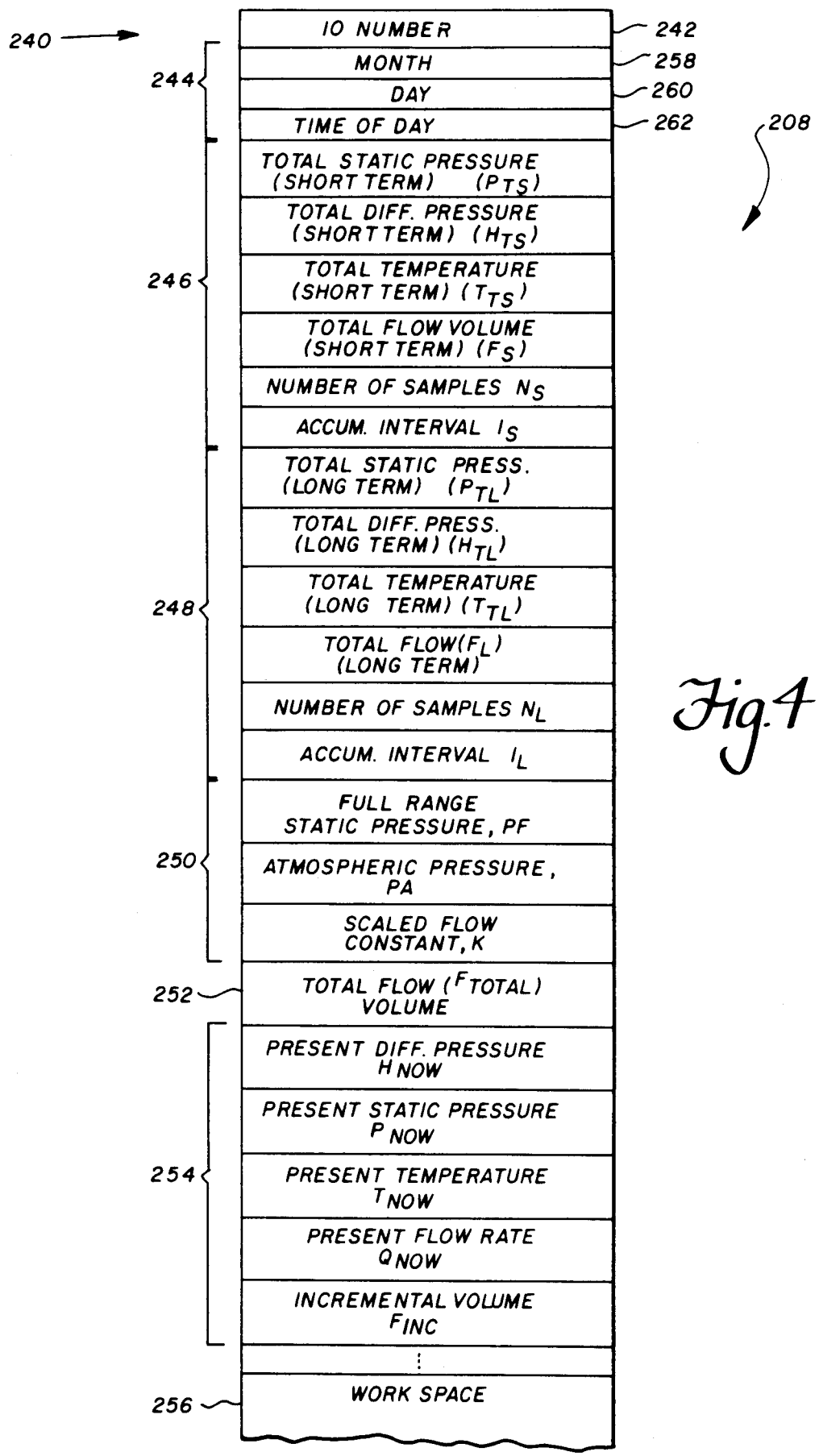
FIG. 4 is a schematic depiction of a data structure stored in the read/write memory of the computation unit shown in FIG. 5 is a flow chart of the steps performed by the computation unit shown in FIG. 2.

FIG. 4 is a schematic diagram of the data structure 240 of computation unit 200. Data structure 240 mainly comprises an identification number block 242, a real-time block 244, a short-term flow data block 246, a long-term flow data block 248, a constant data block 250, a total flow volume block 252, a present data block 254 and work space 256. It is desirable that information of data structure 240 which must be accessed together be stored contiguously in RAM 208 (but, of course, other storage arrangements would also be possible). I.D. number block 242 stores unique identification information which permits interrogation unit 300 to determine which of a possible plurality of computation units 200 the interrogation unit is connected to. Real time block 244 comprises three words; a "month" word 258 stores indicia of the month of the year, a "day" word 260 stores indicia of the day of the month and a "time of day" word 262 stores indicia of the time of day (in hours and hundreds of hours in the preferred embodiment). Of course, real time block 244 could be expanded if desired to include indicia of year, weeks, seconds, etc.

Short-term flow data block 246 stores indicia of the flow of gas 502 over a first time interval (preferable a short-term interval of time such as a day), while long-term flow data block 248 stores similar information for a longer interval of time (a month in the preferred embodiment).

Short-term flow data block 246 includes words storing indicia of each of the following: short term total static pressure of gas 502 ($P_{TS}$), short-term total differential pressure ($H_{TS}$), short-term total (i.e. accumulated) temperature readings ($T_{TS}$), short-term total flow volume $F_S$, the number of samples $N_S$ in the short-term time interval, and the length $I_S$ of the short-term time interval. Long-term flow data block 248 likewise stores values $P_{TL}$, $H_{TL}$, $T_{TL}$, $F_L$, $N_L$, $I_L$ (where "L" is substituted for "S" to differentiate it as data gathered over the long-term time interval).

It is often necessary for the flow of gas from a particular well to be ascertained each day in order for a production manager to make decisions regarding the management of the well, and also to permit billing to be itemized on a day-to-day basis. Gas flow over longer periods of time (for instance a month) may be more useful for monthly contract billing or to rate average long-term well performance. In accordance with the present invention, both sorts of data are independently maintained, permitting short-term data to be read and reset often (e.g. at a particular time every day) while maintaining long-term data intact. The preferred embodiment also includes a non-resettable total flow volume block ($S_{TOTAL}$) 252 which accumulates the volume of flow of gas 502 since initialization of system 100. While the preferred embodiment only stores information with respect to the time intervals discussed above, the present invention is not limited in this way. For instance, it might be desirable to dedicate a different short-term flow data block to each of a plurality of consecutive days to permit independent storage of flow information for each day of a week, each month, etc., while obviating the necessity for interrogating computation unit 200 with interrogation unit 300 at the end of every interval. Likewise, additional data flow blocks could be dedicated to any predetermined or user-specifiable time interval (e.g. a week, a year, etc.) if desired. Indeed, the lengths of the "short-term" and "long-term" time intervals of the preferred embodiment are determined by when interrogation unit 300 was last used to reset corresponding short-term flow data block 246 and long-term flow data block 248, and may therefore be of any desired length. Of course, microprocessor 216 could automatically reset the data blocks at the beginning of each new day, month, etc., or simply allocate a portion of workspace 256 as the flow data block for a new time interval at the end of an interval.

Constant block 250 stores indicia of three numerical constants necessary for calculating gas flow rate and volume: full range static pressure (PF), base atmospheric pressure (PA) and scaled flow constant (K). As will be explained, the values stored in constant block 250 can be user-programmed to insure accuracy of the calculations of system 100. Constants block 250 may also contain other information needed to scale, convert or transform sensor data to obtain useful measurement (as will be explained).

Present data block 254 is a scratch pad block of memory used to store indicia of a the most recently sampled gas flow sample for the purpose of calculating and updating the values of flow data blocks 246, 248 and 252. Present data block 254 includes a word storing indicia of the present differential pressure (HNOW), a word toring indicia of the present static pressure (PNOW) and a word storing indicia of the present gas temperature (TNOW). HNOW, PNOW, and TNOW correspond to the static pressure last sampled by static pressure sensor 504, the differential pressure last sampled by differential pressure sensor 506, and the gas temperature last sampled by temperature sensor 508, respectively. Present data block 254 also includes an intermediate calculation of present instantaneous flow rate (QNOW) of gas 502, and indicia of an intermediate calculation of incremental gas flow volume ($F_{INC}$). Present data block 254 is rewritten once every sampling period (e.g. once every 8.000 seconds) in the preferred embodiment. Work space 256 is a scratch pad section of memory 208 which is used by a microprocessor 216 to perform calculation, etc.

Figure 5:
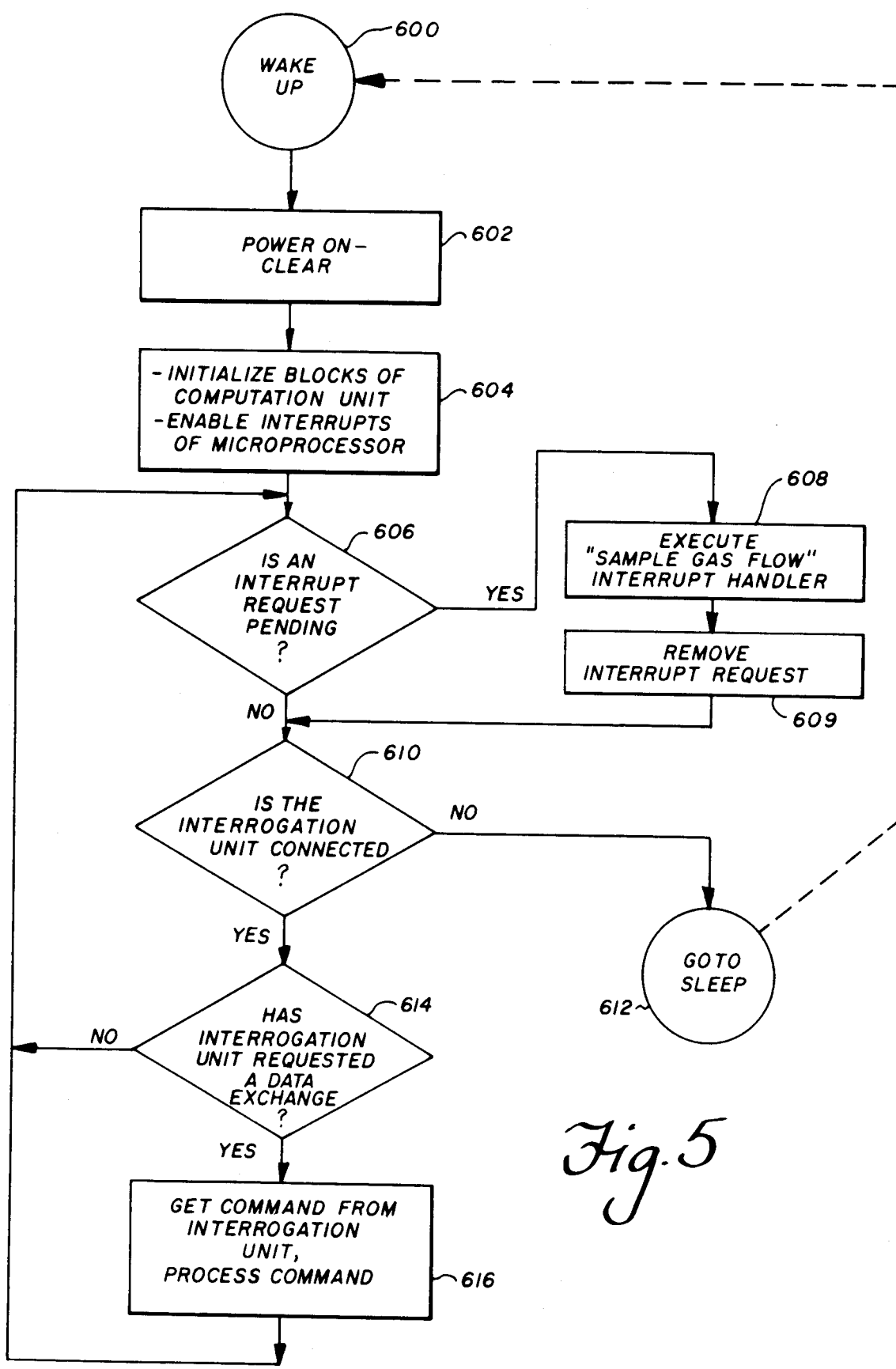

Turning now to the flow charts, FIG. 5 depicts the steps performed by computation unit 200 in accordance with the present invention. The execution of the steps of the flow chart of FIG. 5 begins when oscillator 210 causes power switch 212 to apply power to subsection 206 (block 600). Power on clear circuitry 226 causes a hardware reset of microprocessor 216 (block 602), which in turn causes microprocessor 216 to initialize all software-configurable blocks of computation unit 200 and subsequently, to enable its own interrupt input IRQ (block 604). Meanwhile, latch 224 has been set by oscillator 210, producing a pending interrupt request to microprocessor 216. The decision block 606 determines whether an interrupt request is presently pending. If an interrupt request is pending, gas flow parameters are sampled (block 608). Otherwise, microprocessor 216 determines if interrogation unit 300 is connected (suitable by testing pins of connector 404 which are shorted or grounded when connector 402 is connected thereto) (block 610). If interrogation unit 300 is not connected, computation unit 200 enters a "sleep mode" by switching the power to subsystem 206 off (caused when microprocessor 216 writes a "sleep" signal to power switch 212) (block 612).

If the interrogation unit is connected, it is determined whether the interrogation unit has requested a data exchange (decision block 614). If a data exchange has been requested, the command information sent from the interrogation unit 300 is obtained and processed by a microprocessor 216 (block 616). Otherwise, control is transferred to the decision block 606 to determine if another interrupt request is pending (i.e. whether it is time to take another gas flow sample). The loop comprised of blocks 606, (608, 609), 610, 614 and 616 is continuously executed as long as interrogation unit 300 is connected to computation unit 200. It will be understood that if interrogation unit 300 is not connected to computation unit 200, blocks 600-612 are executed only once every sampling period.

Figure 6:
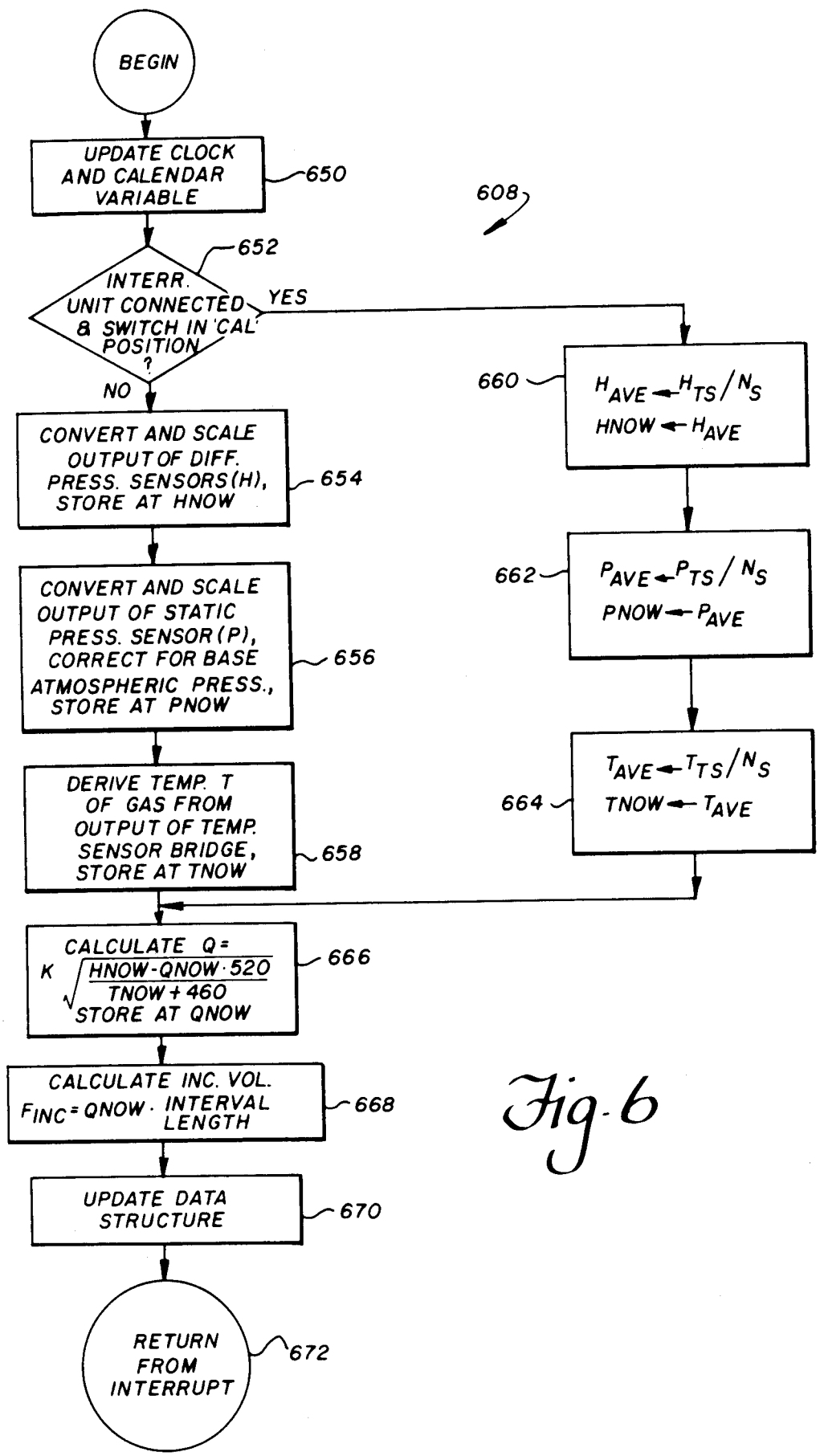
FIG. 6 is a flow chart of the "execute interrupt handler" block 608 shown in FIG. 5.

FIG. 6 is a detailed flow chart of the "sample gas flow" block 608 shown in FIG. 5. In the preferred embodiment, the steps shown in FIG. 6 are performed by a software interrupt handler (which is executed at regular intervals as controlled by oscillator 210). The interrupt handler 608 first updates real time block 244 by incrementing each of words 258-262 as necessary in a conventional manner (block 650) (e.g. time of day word 262 will always be incremented, day word 260 will be incremented only after time of day word 262 "rolls over" from 23.99 hours to 00.00 hours, etc.). Real time block 244 has the same accuracy as oscillator 210 ($\pm 0.01\%$ in the preferred embodiment).

Interrupt handler 608 then samples the state of the "normal/CAL" switch 310 of interrogation unit 300 (decision block 652). If either interrogation unit 300 is not connected or the interrogation unit is connected and switch 310 is in the "normal" position, a gas flow measurement is sampled (blocks 654-658). In particular, the output of differential pressure sensors 506 is routed to ADC 236, converted to digital information, scaled appropriately (and corrected if necessary) and stored at HNOW of present data block 254 (a similar procedure is followed for sensors 504 and 508 to obtain values for PNOW and TNOW). If, however, both interrogation unit 300 is connected to computation unit 200 *and* switch 310 is in its "calibrate" position, blocks 660-664 (which take a simulated sample based upon the average of samples stored in short-term flow data block 246 instead of a "real" samples taken directly from the sensors 504-508) are executed. To compute the average of one of the totalized values $P_{TS}$, $H_{TS}$, or $T_{TS}$, that value is simply divided by the number of samples $N_S$. These average values are then stored in present data block 254 as PNOW, HNOW and TNOW, respectively.

Once the values for HNOW, PNOW and TNOW are known, the present gas flow rate QNOW can be calculated according to the following equation (as is well know):

$$QNOW = K \cdot \frac{HNOW \cdot PNOW \cdot 520}{TNOW + 460} \quad (1)$$

(of course, correction of pressures by base atmospheric pressure PA and full range static pressure PF as well as other conventional conversion, scaling, etc., may be performed before computing QNOW). The result is stored at QNOW of present data block 254 (block 666). Next, the incremental volume $F_{INC}$ of gas which has flowed during the present sampling period is calculated by multiplying QNOW (the present flow rate) by the length of the sample period (e.g. 8.000 seconds), and the result is stored at $F_{INC}$ of present data block 254 (block 668). The present data block 254 is then used to update flow data blocks 246, 248 and 252 (block 670), and a return from interrupt instruction is executed (block 672).

Figure 7:
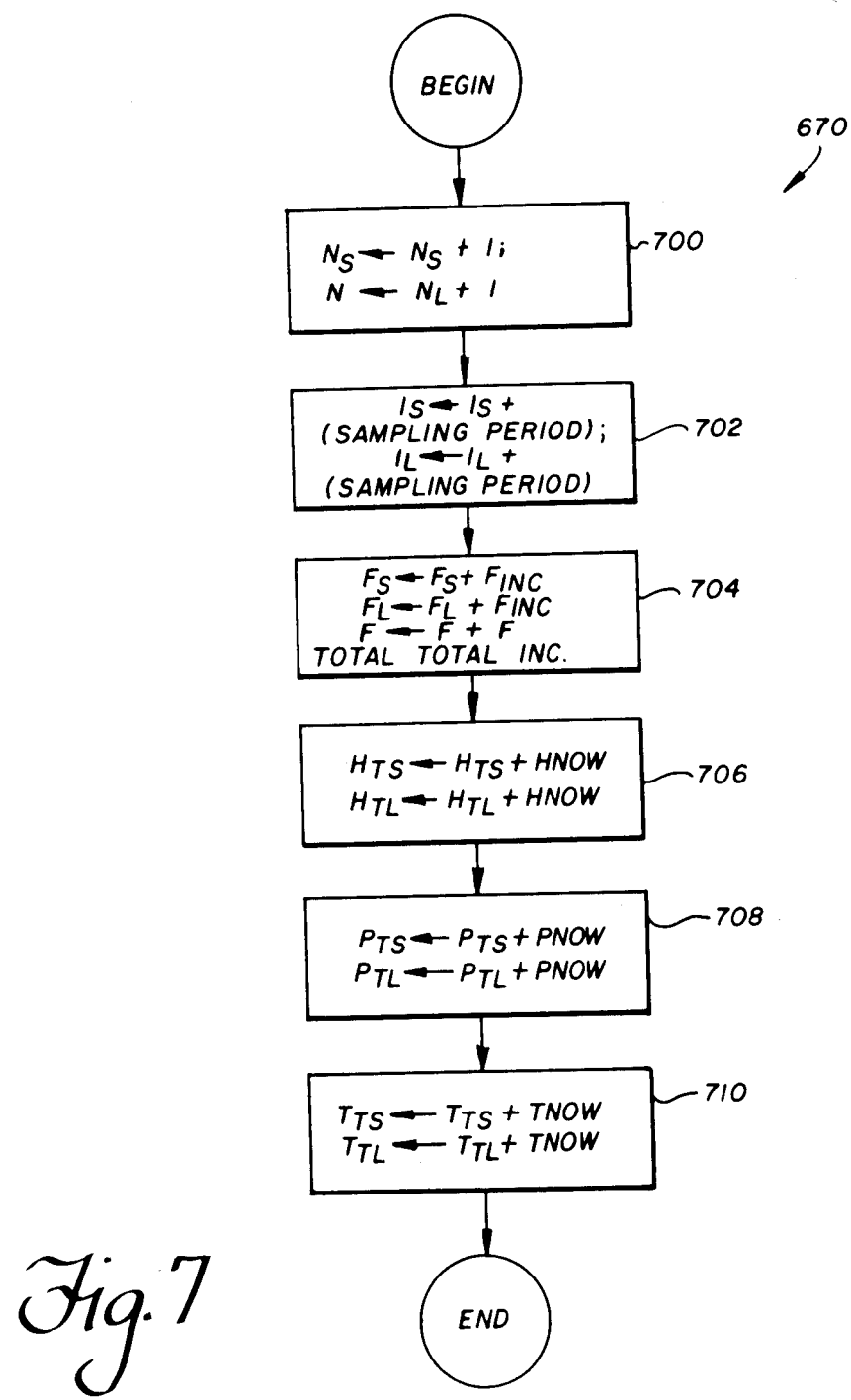
FIG. 7 is a flow chart of the "update data structure" block 670 shown in FIG. 6.

FIG. 7 shows the steps executed to update flow blocks 246, 248 and 252 of data structure 240. The number of samples $N_S$ and $N_L$ of each of flow data blocks 246 and 248 is first incremented (block 700) so that these values accurately reflect the total number of sample periods for the time intervals to which they correspond. Then, the interval lengths associated with each of long-term and short-term flow data blocks 246 and 248 ($I_S$, and $I_L$, respectively) is increased by simply adding the length of the present sampling period (e.g. 8.000 seconds) to each of them (block 702) (conversion to hours may be performed first if desired). Short-term total flow volume ($F_S$), long-term total flow volume ($F_L$) and total flow volume ($F_{TOTAL}$) are each increased by the incremental volume $F_{INC}$ so that they each accurately correspond to the flow volume over their respective intervals of time (block 704). Finally, the total static pressures for each of blocks 246 and 248 ($P_{TS}$ and $P_{TL}$, respectively) are increased by the present differential pressure PNOW (block 708), the total differential pressures $H_{TS}$ and $H_{TL}$ of blocks 246 and 248 are each increased by HNOW (block 706) and the accumulated temperature measurements $T_{TS}$ and $T_{TL}$ are each increased by TNOW (block 710). Although the values incremented in blocks 706–710 are never directly used as useful information of gas flow, they must be maintained in order to permit calculation of average static pressure, average differential pressure and average temperature (as will be understood).

Figure 8:
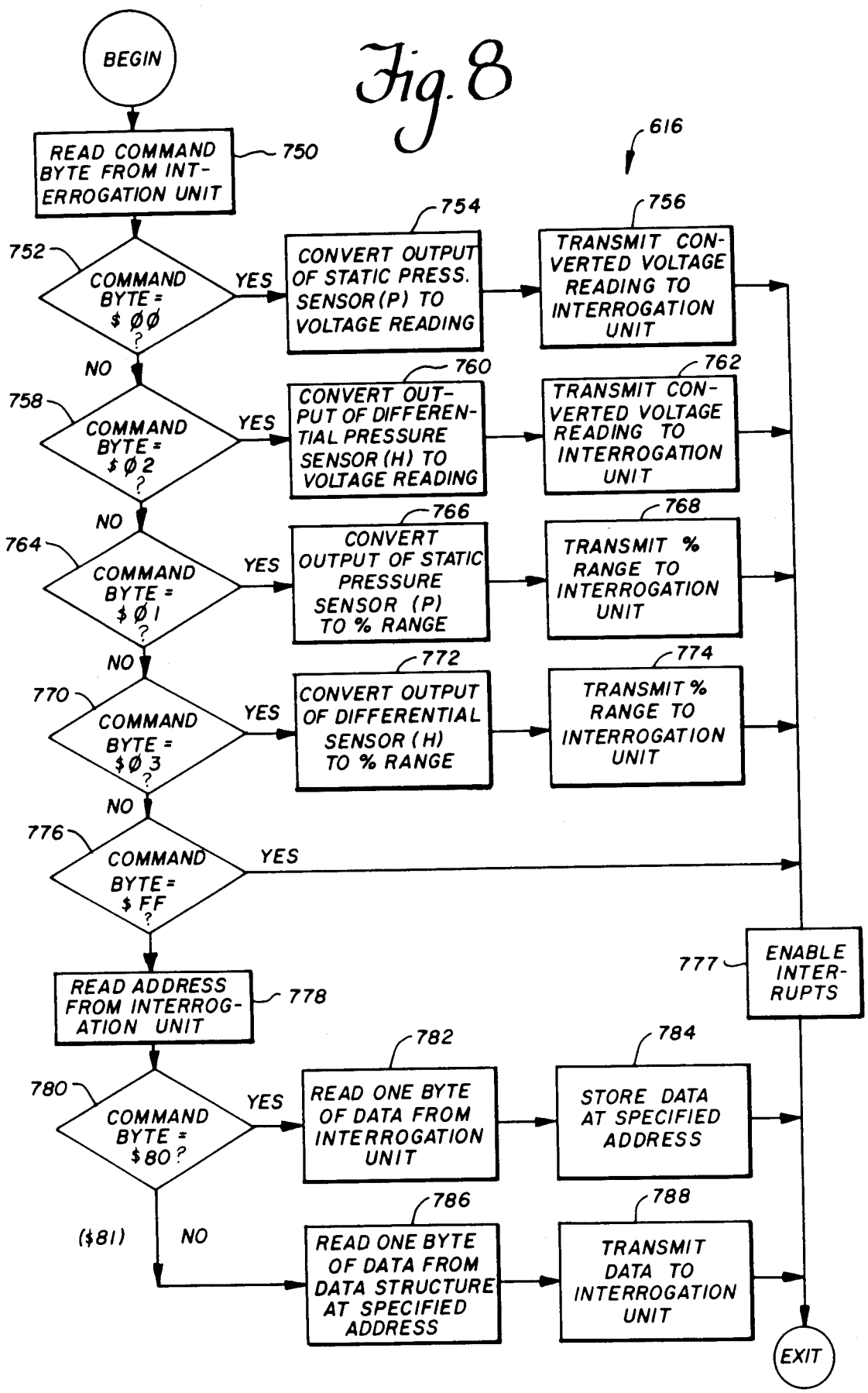
FIG. 8 is a flow chart of the "get command from interrogation unit; process command" block 616 shown in FIG. 5.

FIG. 8 is a detailed flow chart of block 616 of FIG. 5, which processes commands sent to the computation unit 200 by the interrogation unit 300. In the preferred embodiment, there are seven different commands which interrogation unit 300 may transmit. These seven commands are each encoded into one of seven hexidecimal bit patterns of a single byte ($00, $01, $02, $03, $80, $81 and #FF), each of which have a different meaning. Microprocessor 216 of computation unit 200 reads a single command byte sent to the computation unit from interrogation unit 300 (via the serial data link of cable 400) (block 750) and ascertains its value.

Depending upon the meaning of the transmitted command byte itself, either one or several additional bytes must be exchanged to completely execute the command. For instance, if the interrogation unit 300 has requested a direct reading from one of the sensors 504–506, the computation unit 200 will have completed handling the request when it transmits the requested information back to the interrogation unit. The interrogation unit 300 may instead request that the computation unit 200 either send it back the contents of one or more words of data structure 240 (which of the words of the data structure is specified in the preferred embodiment by the interrogation unit) or that it store information specified by the interrogation unit in a specified word. Such information exchange transactions will require the exchange (back and forth) of several bytes of data, as will be explained.

If the command byte has a value of $00, (decision block 752), the interrogation unit has requested that the voltage output of the static pressure sensor 504 be transmitted to it in digital form. Microprocessor 216 causes the output of static pressure sensor 504 to be converted into a digital value (via ADC 236) and transmits the value (2 bytes long in the preferred embodiment) to the interrogation unit 300. (blocks 754 and 756). If the command byte has a value of $02, (as tested for by decision block 758), the same steps are performed for the output of differential pressure sensor 506 (blocks 760, 762).

If the command byte has a value of $01 (block 764), the output of static pressure sensor 504 is transmitted to interrogation unit 300 in terms of percentage of a 100 percent reading (percent range) (blocks 766, 768). Likewise, if the command byte is of value $03 (as tested for by decision block 770), the output of differential pressure sensor 506 is converted to a percent range reading and transmitted to interrogation unit 300 (772, 774). The direct voltage readings and percent range values of the output of static pressure sensor 504 and differential pressure sensors 506 are used in the calibration of system 100.

If the command byte has a value of $FF (block 776), the maskable interrupts of microprocessor 216 are enabled (block 777) to permit computation unit 200 to take a gas flow sample immediately after the present data exchange is completed (block 777 is also executed after execution of each of blocks 756, 762, 768 and 774). In other words, the interrupt input of microprocessor 216 is re-enabled at the conclusion of a complete command exchange.

If the command byte does not have a value as tested for by blocks 752, 758, 764, 770, and 776, then it is a command which requires computation unit 200 to access a byte of information stored at an address in RAM 208 specified by an additional byte of address information transmitted by interrogation unit 300. Computation unit 200 reads the additional byte of address information sent by the interrogation unit 300 (block 778) and tests the command byte (the first byte sent) to determine if it has the value of $80 (decision block 780). If the command byte is equal to $80, the computation unit 200 reads a third byte of data transmitted by interrogation unit 300 (block 782) and stores it at the address in data structure 240 specified by the address byte read by block 778 (block 784). In this way, the interrogation unit 300 can alter the contents of data structure 240 stored in RAM 208 of computation unit 200. If the command byte is not equal to $80, then it must be equal to $81 (only valid command codes may be transmitted by interrogation unit 300), meaning that the interrogation unit has requested computation unit 200 to transmit to it one byte of information stored in RAM 208 at the address specified by the address byte read in block 778. Interrogation unit 200 reads the byte of information at the specified address (block 786) and transmits it to interrogation unit 300 (block 788). The interrupt input of microprocessor of 216 is not reenabled as this point to permit the interrogation unit 300 to write or read an entire block of data stored in RAM 208 without the computation unit 300 changing bytes of data in the middle of a block transfer by taking a sample. (Subsequent to the exchange of the entire block, interrogation unit 300 will transmit a $FF command to re-enable the interrupt input).

Figure 9:
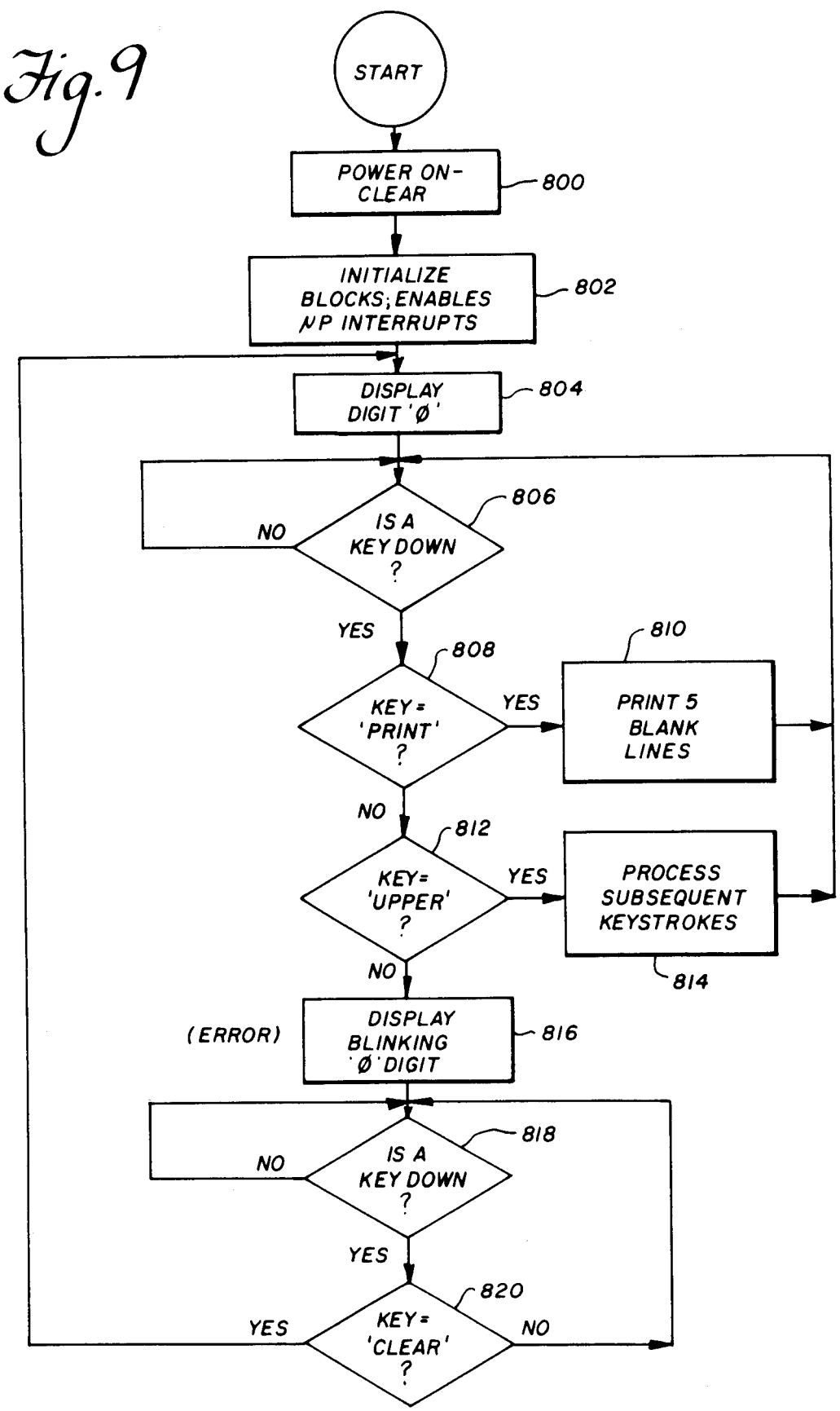
FIG. 9 is a flow chart of the steps performed by the interrogation unit shown in FIG. 3.

FIG. 9 is a schematic diagram of the steps performed by interrogation unit 300. When interrogation unit is first connected to computation unit 200, power-on clear circuit 324 of the interrogation unit causes microprocessor 316 and other components to be hardware reset as previously described (block 800). Microprocessor 316 initializes all software-configurable blocks of interrogation unit 300, and enables its interrupt input (block 802). Microprocessor 316 then effects a display of "0" on display 304 in a conventional fashion, and begins scanning keyboard 306 (at a 4 ms rate in the preferred embodiment, as controlled by a conventional periodic timing signal applied to the microprocessor interrupt input) to determine if a key has been depressed (block 806). If a key has been depressed, microprocessor 316 tests to determine if the key depressed was the "print" key (decision block 808). If so, microprocessor 316 causes 5 blank lines to be printed on printer 308 (block 810). Otherwise, the value of the depressed key is tested to determine if it is the "upper function" key (decision block 812). If not, the operator has not followed data input protocol and an error condition arises; a blinking "0" is displayed on display 304, and the operator must depress the "CLR" key before he can input further information (block 816–820). If the depressed key is the "upper function" key, however, the interrogation unit 300 performs the steps specified by the keys depressed subsequent to the depression of the "upper function" key (block 814).

The significance of depressing keys of keyboard 306 in the preferred embodiment is shown in Table I below (wherein "X" indicates a digit 0-9):

TABLE I

| KEYSTROKE(S) | EFFECT |
| --- | --- |
| (UPPER) (H) | DISPLAY DIFF PRESSURE, % RANGE |
| (UPPER) (H0) | DISPLAY DIFF PRESSURE SENSOR VOLTAGE |
| (UPPER) (H0) (CALIB) | STORE DIFF PRESSURE IN DATA STRUCTURE |
| (UPPER) (H100) | DISPLAY DIFF PRESSURE SENSOR VOLTAGE |
| (UPPER) (H100) (CALIB) | STORE DIFF PRESSURE 100% IN DATA STRUCTURE |
| (UPPER) (P) | DISPLAY STATIC PRESSURE % RANGE |
| (UPPER) (P0) | DISPLAY STATIC PRESSURE SENSOR VOLTAGE |
| (UPPER) (P0) (CALIB) | STORE STATIC PRESSURE 0% SENSOR VOLTAGE IN DATA STRUCTURE |
| (UPPER) (P100) | DISPLAY STATIC PRESSURE SENSOR 100% VOLTAGE |
| (UPPER) (P100) (CALIB) | STORE STATIC PRESSURE 100% SENSOR VOLTAGE IN DATA STRUCTURE |
| (UPPER) (PF) | DISPLAY FULL SCALE STATIC PRESSURE CONSTANT |
| (UPPER) (PF) (XXXX) (SET) | SET FULL SCALE STATIC PRESSURE CONSTANT TO XXXX |
| (UPPER) (PA) | DISPLAY ATMOSPHERIC PRESSURE CONSTANT |
| (UPPER) (PA) (XXXX) (SET) | SET ATMOSPHERIC PRESSURE CONSTANT TO XXXX |
| (UPPER) (K) | DISPLAY SCALED FLOW CONSTANT |
| (UPPER) (K) (XXXX) (SET) | SET SCALED FLOW CONSTANT TO XXXX |
| (UPPER) (MONTH) | DISPLAY CALENDAR MONTH |
| (UPPER) (MONTH) (XX) (SET) | SET CALENDAR MONTH TO XX |
| (UPPER) (MONTH) (PRINT) | PRINT OUT LONG-TERM FLOW DATA FROM DATA STRUCTURE |
| (UPPER) (MONTH) (ZERO) | ZERO LONG-TERM FLOW DATA IN DATA STRUCTURE |
| (UPPER) (DAY) | DISPLAY CALENDAR DAY |
| (UPPER) (DAY) (XX) (SET) | SET CALENDAR DAY TO XX |
| (UPPER) (DAY) (PRINT) | PRINT OUT SHORT-TERM FLOW DATA FROM DATA STRUCTURE |
| (UPPER) (DAY) (ZERO) | ZERO SHORT-TERM FLOW DATA IN DATA STRUCTURE |
| (UPPER) (HOUR) | DISPLAY TIME OF DAY |
| (UPPER) (HOUR) (XXXX) (SET) | SET TIME OF DAY TO XX.XX |

FIG. 10 is a detailed flow chart of block 814 shown in FIG. 9. Decision block 850 implements a wait loop until the next key of keyboard of 306 is depressed. Once a key is depressed, it is determined whether the depressed key is the "H" of "P" key (decision block 852). As can be seen from Table I, the "H" key is depressed to display differential pressure in percentage range, while the "P" key is depressed to request display of static gas pressure in percent range. Interrogation unit 300 obtains the requested information (by transmitting a command byte having a value of $03 or $01, as appropriate, and displaying the information transmitted in response on display of 304.

Similarly, decision block 856 tests to determine if the depressed key was the "P0", "P100", "H0" or "H100" keys, which are depressed to display the output voltage of static pressure sensor 504, or the output voltage of differential pressure sensor 506. If the next key depressed is the "CAL" key, the data transmitted by computation unit 200 is retransmitted back to the computation unit with the appropriate information necessary to cause it to be stored in RAM 208 at a specified address in constant block 250 (in locations not depicted in FIG. 4). In this way, interrogation unit 300 can vary the scaling of the outputs of sensors 504 and 506 (if scaling is used) to achieve accurate results despite variations in the electrical signals produced by the sensors due to wear or maladjustment (if the sensors are electromechanical devices) or other effects. After this data exchange is completed, microprocessor 316 causes display 304 to display a "0" to indicate the end of that calibration step (862). The operation may effect subsequent display of the recored values to verify their correctness if desired.

If the depressed key is one of "PF", "PA", "K", "HOUR", or "MINUTE", the value stored in data structure 240 associated with the particular key (full range static pressure, base atmospheric pressure, scaled slow constant, or time of day word 262 respectively) is retrieved from computation unit 200 and displayed on display 304. If the next key pressed is a numerical key (as tested for by decision block 868), then it is necessary to substitute the inputted value for the value retrieved from the computation unit 200 (block 870). Typically, block 868 and 870 are executed a predetermined number of times to permit the inputting of numerical values of a specified number of digits (e.g. 2 digits for month information, 4 digits for time of day information, etc.).

If the depressed key is either "month" or "day" (as tested for by decision block 872), the value of month word 258 or day word 260, respectively is retrieved from computation unit 200 and displayed on display 304 (block 874). If the next key depressed is the "zero" key (block 876), the long-term flow data block 248 (for "month") or the short-term flow data block 246 (for "day") is cleared by writing an appropriate number of "0"s to interrogation unit 200 together with appropriate address information (block 878) (interrogation unit 300 in the preferred embodiment "knows" the specific addresses in RAM 208 at which computation unit 200 stores each piece of information the interrogation unit may wish to access). If the next key depressed is not the code "zero" key but is instead one of the numerical keys (0–9) (block 880), the input numerical value is transmitted to computation unit 200 to be written over the value of month word 258 or day word 260 (block 882).

If the next key depressed is not one of the numeric keys, but is instead the "print" key (block 884), the operator of interrogation unit 300 has requested a permanent record of the long-term flow data block 248 or the short-term flow data block 246 (for "month" or "day" inputs, respectively). Interrogation unit 300 transmits a series of $81 command bytes each of which are followed by the address of a specified location corresponding to words in data structure 240. Interrogation unit 300 performs calculations on the values received in response to these requests to obtain average values for the time interval of interest, and causes printer 308 to print the information onto paper 314. An example of a "month" printout is shown in Table II below while an example of a "day" printout is shown in Table III below.

TABLE II

| PRINTER OUTPUT | | INTERPRETATION |
|---|---|---|
| ID: | 123456789 | IDENTIFICATION NUMBER OF COMP. UNIT |
| MO: | 11 | CALENDER MONTH |
| DY: | 01 | CALENDAR DAY |
| HR: | 08.12 | TIME OF DAY |
| PF: | 100 | FULL RANGE STATIC PRESSURE (PSIG) |
| PA: | 14.70 | ATMOSPHERIC PRESSURE CONSTANT (INCHES HG) |
| K: | 2345 | LOGGER FLOW CONSTANT |
| FT: | 9874287 | TOTAL NON-RESETTABLE FLOW (SCALED CUBIC FEET) |
| MONTH | | ACCUMULATED DATA SINCE LAST "MONTH ZERO" |
| P: | 74.83 | AVE STATIC PRESSURE (% RANGE, PSIA) |
| H: | 35.67 | AVE DIFF PRESSURE, (% RANGE, INCHES) |
| T: | 84 | AVE FLOW TEMP (DEGREES F) |
| I: | 720.08 | ACCUMULATION INTERVAL (HOURS) |
| F: | 352963 | TOTAL FLOW DURING INTERVAL, (SCALED CUBIC FEET) |
| NOW | | |
| P: | 73.77 | CURRENT STATIC PRESSURE, (% RANGE, PSIG) |
| H: | 42.84 | CURRENT DIFF PRESSURE, (% RANGE, INCHES) |
| T: | 86 | CURRENT FLOW TEMP, (DEGREES F.) |
| F: | 632 | CURRENT FLOW RATE, (SCALED CUBIC FEET PER HOUR) |

TABLE III

| PRINTER OUTPUT | | INTERPRETATION |
|---|---|---|
| ID: | 123456789 | IDENTIFICATION NUMBER OF COMP. UNIT |
| MO: | 10 | CALENDER MONTH |
| DY: | 28 | CALENDAR DAY |
| HR: | 13.25 | TIME OF DAY |
| FT: | 768899999 | TOTAL NON-RESETTABLE FLOW (SCALED CUBIC FEET) |
| DAY | | ACCUMULATED DATA SINCE LAST "DAY ZERO" |

TABLE III-continued

| PRINTER OUTPUT | | INTERPRETATION |
|---|---|---|
| P: | 73.25 | AVE STATIC PRESSURE (% RANGE, PSIA) |
| H: | 38.29 | AVE DIFF PRESSURE, (% RANGE, INCHES) |
| T: | 87 | AVE FLOW TEMP (DEGREES F.) |
| I: | 24.12 | ACCUMULATION INTERVAL (HOURS) |
| F: | 12345 | TOTAL FLOW DURING INTERVAL, (SCALED CUBIC FEET) |
| NOW | | |
| P: | 58.95 | CURRENT STATIC PRESSURE, (% RANGE, PSIG) |
| H: | 35.26 | CURRENT DIFF PRESSURE, (% RANGE, INCHES) |
| T: | 85 | CURRENT FLOW TEMP, (DEGREES F.) |
| F: | 515 | CURRENT FLOW RATE, (SCALED CUBIC FEET PER HOUR) |

If the depressed key is not the "month" or "day" key, an illegal character has been entered and the "CLR" key must be depressed before further legal data will be recognized (blocks 888–892).

In summary, to make a permanent accurate record of the short-term flow data, only a few simple key strokes are required; the operator simply depresses the "upper function", "day" and "print" keys to obtain a print-out of the contents of short-term flow data block 246 (see Table III). The operator would then typically clear the short-term flow data block 246 by depressing the "upper function", "day" and "zero" keys (in that order). Similar key strokes are used to obtain a permanent record of the long-term flow data block 248, except that the "month" key is substituted for the "day" key. Flow data for the portion of the month up to the present can be provided if desired, while the month data need not be reset until the end of the month. The interrogation unit 300 of the preferred embodiment should be connected to the computation unit 200 periodically (e.g. every day) and the "day" key strokes described above input if a daily record of a gas flow data is desired (since the time of connection determines the length of the short-term time interval) As can be seen from Table I, any of the constant blocks 250 may be changed at will, and system 100 will immediately begin using the new values on all subsequent gas flow samples.

It is sometimes necessary to recalibrate the static pressure sensor 504 and the differential pressure sensor 506 of computation unit 200 while system 100 is in use in order to insure accurate measurements. To initialize computation unit 200 (e.g. after it has been first installed, after it has been extensively serviced, etc.), it is necessary to set real time block 244, full range static pressure PF, base atmospheric pressure PA and scaled flow constant K of data structure 240 (in the preferred embodiment, sampling is initiated by setting the "month" word 258) It is also necessary to clear flow data blocks 246, 248 and 252. To recalibrate the scaling factors applied to the outputs of one or both of sensors 506 and 508, the interrogation unit 300 is connected to computation unit 200 and switch 310 is placed into the "CAL" position (causing the computation unit 200 to use average daily values instead of the outputs of sensors 504 and 506 to update data structure 240). At this time, sensors 504 and 506 can be disconnected from computation unit 200 if desired and tested with external test equipment and replaced if necessary. More usually, any inaccuracies are produced because the characteristics of sensors 504 and 506 have changed, requiring different scaling factors to be used in their interpretation. As will be understood, sensors 504–508 need not be direct-reading devices, but instead may require that their outputs be scaled, processed and even linearized (or otherwise transformed) to obtain desired information from them. They may have to be adjusted (to operate in a linear range, etc.). Transformation and scaling may require that microprocessor 216 interpret the received sensor data according to conventional equations utilizing additional constants stored in data structure 240. The values of these additional constants may have to be changed (if the sensors are adjusted or their output levels shift) in order to ensure accuracy.

To alter the scaling factor of, for instance, the output of static pressure sensor 504, the "upper function" key "P0" keys are depressed to display the output of the static pressure sensor in volts on display 304 of interrogation unit 300. Adjustments may then be made to the sensor 504 itself, to the DC offset voltage applied to adder 230, etc. and a new voltage reading taken, until the output voltage is at a desired level (to ensure linearity of the sensor, especially if it is electromechanical, to prevent analog components of computation units 200 from being overdriven, etc.). The "CAL" key of keyboard 306 is then depressed to store this voltage reading in RAM 208 as a reference for later comparisons. Calibration of the output of differential pressure sensor 506 may be accomplished in a similar fashion.

Although one exemplary embodiment has been described in detail above, those skilled in the art will appreciate that many variations and modifications may be made without departing from the novel and advantageous features of the invention. Moreover, the present invention is by no means limited to the particular components described above, but rather, could be implemented in a variety of other different ways. Accordingly, all such variations and modifications are intended to be included within the scope of the appended claims.

What is claimed is:

1. An apparatus for measuring gas flow comprising:
   measuring means connected to a gas conduit at a fixed position thereof for producing periodic signals indicative of flow parameters of gas flowing through said conduit including means disposed within said conduit for restricting the cross sectional diameter thereof, having transducer means positioned on opposite sides of said restriction for producing periodic signals proportional to differential pressure across said restricting means;
   computing means, connected to receive said periodic signals provided by said measuring means, for producing from said periodic signals indicia of the amount of gas flowing through said conduit over a first time interval greater than the periods of said periods signals and for producing indicia of the amount of gas flowing through said conduit over a plurality of different time intervals;
   means for storing indicia of the amount of flow associated with each of said plurality of different time periods including means storing the values of numerical constants and measured gas flow characteristics used to produce said indicia of gas flow for each of said time periods to verify the accuracy of said produced indicia of gas flow; and
   portable interrogating means, selectively connected to said storing means, and including means for initializing and calibrating said computing means to thereby assure accuracy of measurement and being selectively operable for extracting said stored indicia of the amount of flow associated with a selected one of said plurality of time intervals, and having means for selectively determining the length of each of said plurality of time intervals, said interrogating means including means for making a permanent digital record of said extracted indicia of the amount of flow.

2. An apparatus as in claim 1 wherein:
   said storing means also stores indicia of real
   said computing means periodically updates said indicia of real time; and
   said interrogating means includes means for extracting the indicia of real time.

3. An apparatus as in claim 1 wherein:
   said interrogating means includes means for selectively determining the length of said first time interval.

4. An apparatus as in claim 1 wherein:
   said record-making means comprises means for imprinting said extracted indicia onto a medium.

5. An apparatus as in claim 1 wherein:
   said interrogating means includes means for calibrating said computing means; and
   said computing means includes means for producing an extrapolation of said stored indicia of amount of flow while said calibrating means calibrates said computing means, for storing by said storing means.

6. An apparatus as in claim 5 wherein:
   said computing means stores the value of at least one constant used for producing indicia of the amount of flow; and
   said interrogating means includes means for changing the value of said constant during calibration of said computing means by said calibrating means.

7. An apparatus as in claim 1 wherein:
   said computing means stores the value of at least one constant used for producing indicia of the amount of flow; and
   said record-making means further includes automatically making a permanent digital record of said value of the constant with the making of said permanent digital record of said extracted indicia of the amount of flow.

8. An apparatus as in claim 1 wherein:
   said interrogating means includes means for setting the indicia of the amount of flow to an initial value after a permanent digital record of the amount of flow has been made.

9. An apparatus as in claim 1 wherein:
   said interrogating means includes means for selectively setting the indicia of the amount of flow for each time interval to an initial value after a permanent digital record of the amount of flow has been made.

10. A method of providing a permanent digital record of the amount of gas flowing through a conduit over a first period of time comprising:
    sensing flow parameters of gas flowing through said conduit at a fixed location, including the rate of follow by disposed in said conduit a means for restricting the cross sectional diameter thereof, and positioning transducer means on opposite sides of said means for restricting for sensing differential gas pressure across said means for restricting;

producing from each sensing flow parameter a periodic digital signal indicative of the parameter;

producing digital indicia of the amount of gas flowing through the conduit over a first time interval greater than the periods of the produced signals;

storing the produced digital indicia of the amount of gas flow in a computer memory, including storing the values of numerical constants and measured gas flow characteristics used in producing said indicia of gas flow to thereby provide verification of the accuracy of said produced indicia of gas flow;

extracting the stored digital indicia of the amount of gas flow; and making a permanent digital record of the extracted indicia of the amount of gas flow.

11. A method according to claim 10 further including prior to said producing indicia, determining the length of the first time interval.

12. A method according to claim 10 further including calibrating the producing of the indicia of the amount of gas flow by:

establishing the value of at least one constant for use in producing the indicia of the amount of flow appropriate for the gas and the conditions associated with the gas;

storing the value of the constant digitally in the computer memory; and said producing further including using the value of the constant for producing the indicia of the amount of gas flow.

13. A method according to claim 12 further including recalibrating the producing of the indicia of gas flow by establishing a different value of the constant when conditions associated with the gas change; and storing the different value of the constant in the computer memory.

14. A method according to claim 13 further including, during said recalibrating, producing an extrapolation of the previously stored indicia of the amount of gas flow; and storing the produced extrapolation as the indicia of the amount of gas flow.

15. A method according to claim 10 further including resetting the stored indicia of the amount of gas flow to an initial value after making a permanent digital record of the amount of flow for the first time period.

* * * * *